United States Patent [19]

Schniederjan

[11] Patent Number: 4,544,330
[45] Date of Patent: Oct. 1, 1985

[54] CONTROL APPARATUS FOR SEVERAL DRIVE ASSEMBLIES CONSISTING OF HYDROSTATIC DRIVE UNITS

[75] Inventor: Reinhold Schniederjan, Neu-Ulm, Fed. Rep. of Germany

[73] Assignee: Hydromatik GmbH, Fed. Rep. of Germany

[21] Appl. No.: 613,502

[22] Filed: May 23, 1984

[30] Foreign Application Priority Data

Jun. 28, 1983 [DE] Fed. Rep. of Germany ....... 3323278

[51] Int. Cl.$^4$ ................................................ F04B 1/06
[52] U.S. Cl. ...................................... 417/218; 91/506
[58] Field of Search .................... 417/218, 222; 91/506

[56] References Cited

U.S. PATENT DOCUMENTS

| 3,407,738 | 10/1968 | Bosch | 417/218 |
| 3,510,231 | 5/1970 | Bobst | 417/218 |
| 3,694,108 | 9/1972 | Pensa | 91/506 |
| 4,077,744 | 3/1978 | Pensa | 91/506 |
| 4,273,517 | 6/1981 | Heyl | 91/506 |
| 4,320,100 | 1/1983 | Forster | 417/218 |

FOREIGN PATENT DOCUMENTS

| 2003774 | 7/1971 | Fed. Rep. of Germany | 91/506 |
| 2810062 | 9/1979 | Fed. Rep. of Germany | 417/218 |
| 1147165 | 8/1966 | United Kingdom | 417/222 |

Primary Examiner—William L. Freeh
Attorney, Agent, or Firm—Scully, Scott, Murphy & Presser

[57] ABSTRACT

A control apparatus for several drive assemblies, which consist of hydrostatic drive units, is described. The hydraulic pumps of the hydrostatic drives are driven by means of a common prime mover and are controlled in terms of output. The output control device consists of an adjusting piston, which is connected with the control element of the hydraulic pumps and upon both sides of which pressure acts, and of a spool valve which controls the pressure action on both pressure chambers at the front surfaces of the adjusting piston and upon which, on one side, the working pressure of the pumps acts and upon which, on the other side, an adjustable spring acts. In order to give priority to one of the hydraulic pumps or one of the drive assemblies and to allow sufficient output to come from the driving engine in each operating condition, there is provided a measuring piston upon which the working pressure of the priority hydraulic pump acts and which presses on a first lever which counteracts the force of the adjustable spring acting upon the spool valve of the output control apparatus.

5 Claims, 2 Drawing Figures

CONTROL APPARATUS FOR SEVERAL DRIVE ASSEMBLIES CONSISTING OF HYDROSTATIC DRIVE UNITS

TECHNICAL FIELD OF INVENTION

The invention relates to a control apparatus for several drive assemblies which consist of hydrostatic drive units, the hydraulic pumps of which assemblies are driven by a common prime mover or driving engine and of which pumps a first pump or group of pumps is equipped with a hyperbolic (total) output control device, and wherein there is a second pump of a drive assembly which is output-preferred in the control situation, wherein the output control device consists of an adjusting piston, which is connected with the control element of the first pump or group of pumps and upon both sides of which pressure acts, and of a spool valve (or distributing slide valve) which controls the pressure action on both pressure chambers at the front surfaces of the adjusting piston and upon which, on one side, the working pressure of the first pump or group of pumps acts and upon which, on the other side, an adjustable spring acts.

BRIEF DESCRIPTION OF THE PRIOR ART

It is usual to provide a single driving motor for the several hydraulic pumps of the various drive assemblies within a machine, for example, a construction machine such as an excavator and the like. The maximum output of this driving motor is then less than the sum total of the maximum outputs of the hydraulic pumps for, during practical operation, all of the drive assemblies can rarely be operated with full output at the same time.

In the most simple case, one of the hydraulic pumps of a drive assembly has a constant throughput and serves a working circuit which is considered to have priority while another of these hydraulic pumps or group of hydraulic pumps has a variable throughput and serves further working circuits which do not take precedence or have priority. In the event that the sum total of the outputs required at a given moment to drive the preferred hydraulic pump and the additional pumps or groups of pumps is greater than the maximum output of the driving motor, a device must be provided which allows continuation of the drive of the preferred hydraulic pump with the desired output, i.e. precedence is given to the priority circuit, and which automatically limits the driving output of the additional hydraulic pump or groups of pumps in such a way that the total output, which is required to drive all the pumps, remains less than or at most equal to the maximum output of the driving motor.

An apparatus of this kind with preference for a drive assembly has, for example, become known from German OLS No. 24 19 529. The valve-control mechanism, which is proposed as a solution in the said Offenlegungsschrift and which is for the purpose of giving preference to a working cycle, is, however, very expensive and dissipates output.

A control apparatus for the hydrostatic travel drive and the tool drives for a loader vehicle has become known from German ALS No. 20 38 414, in which the hydraulic pump of the hydrostatic tool drive is a preferred fixed displacement pump while the pump or pumps of the hydrostatic travel drives are controlled in terms of total output. For this, the working pressure of the priority hydraulic pump of the tool drive is transmitted to a stepped surface of the differential piston of the total output control device for the non-priority hydraulic pump or hydraulic pumps. A control apparatus of this kind cannot be used universally as it is only possible to make adjustments to suit various sizes of pump and combinations of assemblies by means of another total output control device having another gradation of the differential piston.

Control apparatus of the kind specified by way of introduction, though without priority for a hydraulic pump or for a hydrostatic drive fed thereby, has become known from German ALS No. 12 67 092 and German OLS No. 28 10 062. In these cases the spool valve, which is pre-stressed by an adjustable spring and upon which, on the other side, the working pressure of the pump or pumps acts, is arranged in the adjusting piston of the output control device in a cross-sliding manner.

OBJECT OF THE INVENTION

The underlying object of the invention is to develop a control apparatus of the kind specified above, whilst introducing priority for at least one of the hydraulic pumps, in such a way that adjustment for the assignment of a priority hydraulic pump is possible in a simple manner.

SUMMARY OF THE INVENTION

In order to achieve this object, there is provided a controll apparatus for a plurality of drive assemblies including hydrostatic drive units. The drive units include one or more first hydraulic pumps each having a total output control device and a capacity adjusting device. An output preferred hydraulic pump having an adjustable output control device and a capacity adjusting device is also included. All the hydraulic pumps are driven by a common prime mover. The adjustable output control device includes an adjusting piston connected to the capacity adjusting device of the one or more first hydraulic pumps, and a spool valve for controlling the pressure action of the adjusting piston. The spool valve is connected on one side to a pressure line from the one or more first hydraulic pumps and is acted upon on an opposing side by an adjustable spring. There is further provided a first lever acting upon the adjustable spring which is supported by an adjustable support means forming first and second lever arms, the length of which are adjustable. A measuring piston presses against the first lever to counteract the force of the adjustable spring acting upon the spool valve. The measuring piston is connected to a pressure line from the output preferred hydraulic pump for controlling the action of the measuring piston.

The fulcrum support means for the first lever is shiftable on the housing of the spool valve. The spool valve is arranged in the adjusting piston crosswise in respect to the longitudinal axis of the adjusting piston and the adjustable spring acts on the spool valve by way of a second lever which is pivoted in the housing. The second lever has a lever arm which extends parallel to the longitudinal axis of the adjusting piston and against which the spool valve rests in a sliding manner. The first lever acts on the second lever against the force of the adjustable spring which acts on the second lever.

In a further embodiment a pressure averager is arranged before the total output control device of the first group of pumps. The pressure averager produces an average pressure from the working pressures of the individual pumps of the groups and this pressure is transmitted as the working pressure to one side of the spool valve and the adjusting piston.

The underlying principle of the invention, as a fundamental idea for the coordination or assignment of a more preferred hydraulic pump for the output control of one or several pumps which are controlled in terms of total output is to vary the spring initial tension of the spring, which determines the control characteristics, of the output control device or of the spool valve of the output control device through the action of the working pressure of the more preferred hydraulic pump upon this spring. It is possible to make adjustments to suit various preferred hydraulic pumps in a simple manner by varying the effective length of lever arm for the measuring piston which acts upon the lever varying the spring initial tension.

The control apparatus according to the invention also operates when the more preferred hydraulic pump is a pump which per se is output-controlled. At the start of control it is then solely required to take care, for example by means of a pressure-reducing valve, that the working pressure of this preferred pump, which pressure acts upon the measuring piston and the lever, is kept constant.

If in the case of a control apparatus according to the invention there is provided, instead of an individual non-priority hydraulic pump a group of pumps, which are coupled, for example as twin pumps or multiple pumps in respect of the output control device, as an advantageous development of the invention, there is arranged before the adjusting piston or the spool valve a pressure averager which produces a mean pressure from the working pressures of the individual pumps of the group. A pressure averager of this kind can be constructed, for example, in accordance with the subject matter of the assignee's previous German Application No. P 33 10 791.2 and corresponding U.S. application Ser. No. 593,617 by Ludwig Wagneseil, assigned to the assignee of the present application, the entire application of which is hereby incorporated by reference.

BRIEF DESCRIPTION OF THE DRAWINGS

An advantageous development of the invention is described in greater detail in the following with the aid of the attached drawings, in which.

DETAILED DESCRIPTION OF THE PREFERRED EMBODIMENT OF THE INVENTION

Figure 1:
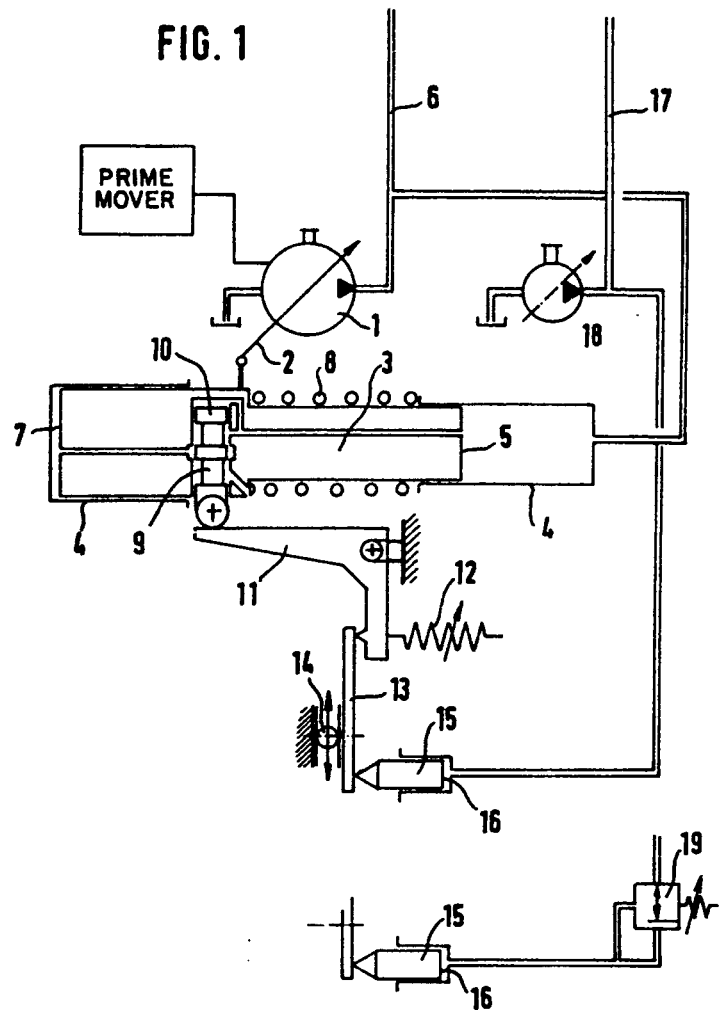
FIG. 1 diagrammatically shows a control apparatus according to the invention with a priority and a subordinate hydraulic pump.

A first pump of a hydrostatic drive unit of a drive assembly is referenced 1. This first pump 1 is controlled in terms of output by means of an adjusting piston 3, which is connected with the pump's capacity adjusting device 2, in a housing 4. The pressure in the working line 6 of the hydrostatic drive unit, which is fed by means of the pump 1, acts on one side of the adjusting piston 3 on the surface 5. A control pressure, which is derived from the working pressure in accordance with the piston of a spool valve 9, which lies cross-wise in the adjusting piston 3, acts, on the other side, on the greater surface 7 of the adjusting piston 3 against the pressure of the spring 8. On the spool valve 9, there acts, on one side on the surface 10, likewise the working pressure of the line 6 and, on the other side, by way of a second lever 11, which is constructed as a bell-crank lever, an adjustable spring 12, the initial tension of which determines the control characteristics. Opposite the spring 12 a first lever 13 acts on the second lever 11, which first lever 13 is supported at a point of support 14 fixed in the housing and upon the second arm of which there acts a measuring piston 15, upon the piston surface 16 of which there acts the working pressure in the line 17 of a priority hydrostatic drive unit, to which the priority second hydraulic pump 18 belongs. The support 14 for the lever 13 may be shifted in the housing, which is not shown, in accordance with the arrows shown so that the effective length of lever arm with respect to the measuring piston 15 on the lever 13 may be adjusted.

In the control situation, the measuring piston 15 presses against the lever 13 which counteracts the adjustment in respect of initial tension of the measuring spring 13 at the lever 11 so that the control characteristics of the spring 12 for the spool valve 9 are varied.

Figure 2:
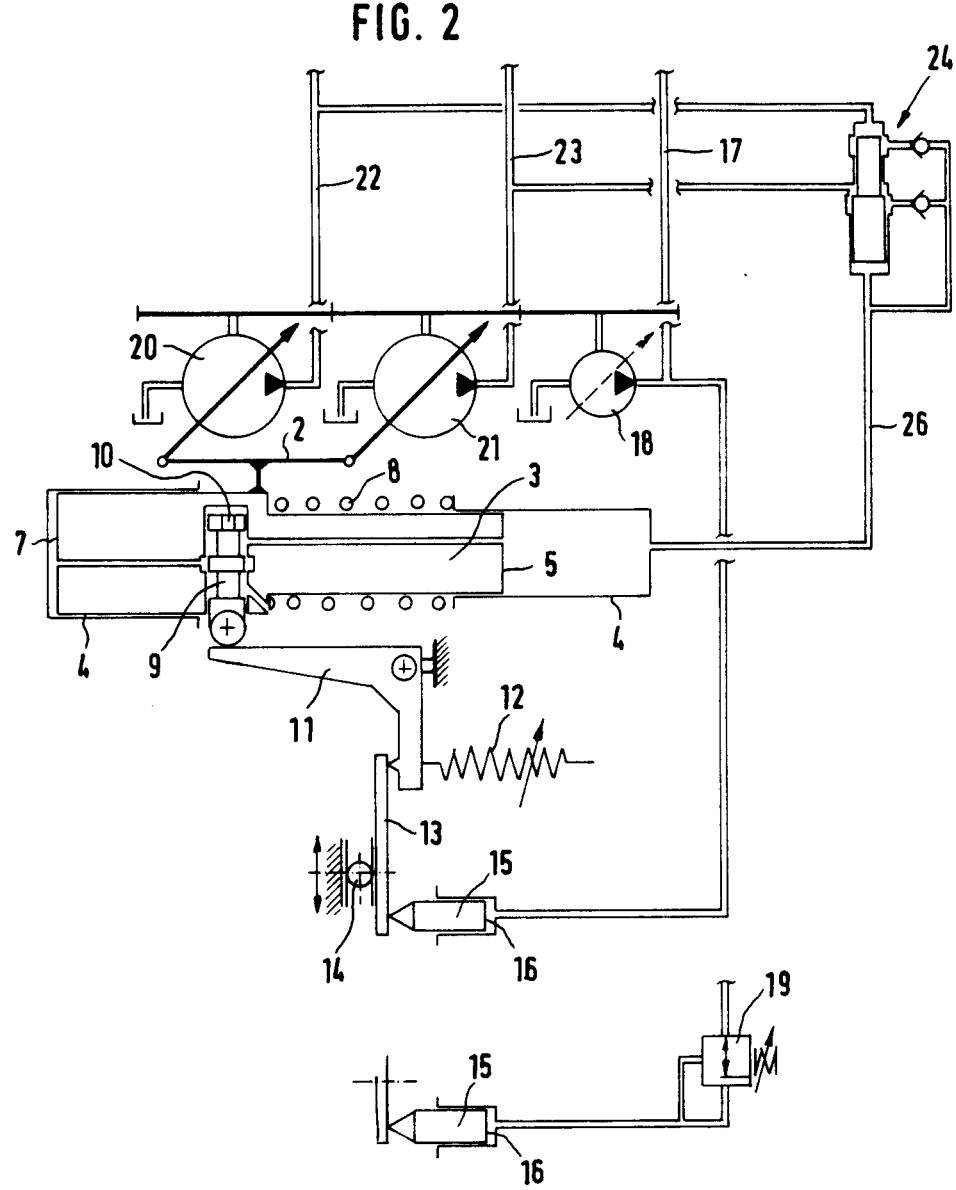
FIG. 2 shows a corresponding embodiment of the invention for twin pumps as a subordinate hydraulic pump, the arrangement of a pressure-reducing valve before the measuring piston being shown at the bottom of both figures in a cutaway section, if the priority pump is a pump which per se is output-controlled.

A pressure-reducing valve 19 in the line before the measuring piston 15 is shown additionally at the bottom of FIGS. 1 and 2. This valve is required in the event that the priority hydrostatic drive unit, which is fed by means of the second pump 18, is an output-controlled drive unit.

The embodiment according to FIG. 2 differs from the embodiment according to FIG. 1 only in that coupled pumps 20, 21 for two jointly output-controlled hydrostatic drive units having the working pressure lines 22, 23 are provided instead of the first non-priority hydraulic pump 1. The pumps 20 and 21 have their capacity adjusting devices coupled and are connected with the adjusting piston 3. Portions which correspond with the embodiment according to FIG. 1 are provided with the same reference symbols and are not commented upon again. In the line 26, which leads to the adjusting piston 3 and which transfers the working pressure, which forms the basis of the output control, there is arranged a pressure averager which is referenced 24 and which averages the working pressures in the lines 22 and 23 so that the pumps 20 and 21 are controlled in terms of total output. The pressure averager 24 is constructed in accordance with the subject matter of the previous German Application No. P 33 10 791.2-14 and corresponding U.S. application Ser. No. 593,615 and is not described in detail.

The pumps in the embodiments of FIGS. 1 and 2 are driven by a common prime mover. In FIG. 1, the prime mover is shown connected to pump 1, however, a similar connection is made to pump 18. Correspondingly, in FIG. 2, although not illustrated, a single prime mover has connections to each pump 18, 20 and 21 similar to that shown in FIG. 1.

What is claimed is:

1. A control apparatus for a plurality of drive assemblies including hydrostatic drive units comprising:
    one or more first hydraulic pumps each having a total output control device and a capacity adjusting device;

an output-preferred hydraulic pump having an adjustable output control device and a capacity adjusting device;

a prime mover for driving said first output-preferred hydraulic pumps;

said adjustable output control device including an adjusting piston connected to the capacity adjusting device of said one or more first hydraulic pumps, and a spool valve for controlling the pressure action of said adjusting piston on one side of said adjusting piston, said spool valve being connected on one side to a pressure line from said one or more first hydraulic pumps and said spool valve being acted upon on an opposing side by an adjustable spring;

a first lever acting upon said adjustable spring, said first lever being supported by an adjustable fulcrum support means forming first and second lever arms, the length of said arms being adjustable; and a measuring piston which presses against said first lever to counteract the force of said adjustable spring acting upon the spool valve, said measuring piston being connected to a pressure line from said output-preferred hydraulic pump for controlling the action of the measuring pump.

2. Control apparatus according to claim 1, characterized in that the fulcrum of the lever is shiftable on the housing of the spool valve.

3. Control apparatus according to claim 1, characterized in that with a first group of pumps a pressure averager is arranged before the total output control device, which averager produces an average pressure from the working pressures of the individual pumps of the groups and this pressure is transmitted as the working pressure to the one side of the spool valve and the adjusting piston.

4. Control apparatus according to claim 1, characterized in that the spool valve is arranged in the adjusting piston cross-wise in respect of the latter's longitudinal axis and the adjustable spring acts on the spool valve by way of a second lever which is pivoted in the housing.

5. Control apparatus according to claim 4, characterized in that the second lever has a lever arm which extends parallel to the longitudinal axis of the adjusting piston and against which the spool valve rests in a sliding manner, and in that the first lever acts on the second lever against the force of the adjustable spring which acts on the second lever.

* * * * *